United States Patent [19]

Carey et al.

[11] Patent Number: 4,764,544

[45] Date of Patent: Aug. 16, 1988

[54] FILLER AND POLYMER COMPOSITION CONTAINING FILLER

[75] Inventors: John G. Carey, Warrington; Roger N. Rothon, Chester; Martin Bottrill, Slough, all of United Kingdom

[73] Assignee: Imperial Chemical Industries PLC, London, England

[21] Appl. No.: 766,781

[22] Filed: Aug. 19, 1985

[30] Foreign Application Priority Data

Aug. 22, 1984 [GB] United Kingdom ................ 8421288

[51] Int. Cl.[4] ................................................ C08K 9/04
[52] U.S. Cl. ..................................... 523/205; 428/403; 428/407; 513/206
[58] Field of Search ................ 523/205, 206; 428/403, 428/407

[56] References Cited

U.S. PATENT DOCUMENTS

| | | | |
|---|---|---|---|
| 3,544,500 | 12/1970 | Osmond et al. | 523/205 |
| 3,763,084 | 10/1973 | Grudus et al. | |
| 3,956,230 | 5/1976 | Gaylord | 523/205 |
| 4,124,562 | 11/1978 | Yui et al. | 523/205 |
| 4,252,713 | 2/1981 | Kahane | 523/205 |
| 4,377,418 | 3/1983 | Birchall et al. | 523/205 |
| 4,418,163 | 11/1983 | Murakami et al. | 523/205 |
| 4,490,436 | 12/1984 | Kawakami et al. | 428/403 |
| 4,496,670 | 1/1985 | Vas et al. | 523/205 |

FOREIGN PATENT DOCUMENTS

| | | | |
|---|---|---|---|
| 0041614 | 12/1981 | European Pat. Off. | |
| 0113315 | 7/1984 | European Pat. Off. | 523/205 |
| 0028590 | 11/1969 | Japan | 523/205 |
| 0018944 | 2/1974 | Japan | 523/205 |
| 0165960 | 12/1980 | Japan | 523/205 |
| 0588521 | 6/1977 | Switzerland | 523/205 |
| 1603300 | 11/1981 | United Kingdom. | |

OTHER PUBLICATIONS

Derwent Abs. 60793x/32 (6-1976) Yamaguchi et al.

Primary Examiner—Herbert J. Lilling
Attorney, Agent, or Firm—Cushman, Darby & Cushman

[57] ABSTRACT

A coated particulate filler to the surface of which there is bound an acid group-containing organic polymer which also comprises a nitrogen-containing group capable of reacting with an organic polymeric material. The acidic group may be a carboxylic acid group and the nitrogen-containing group may be an amide group or an amine group, especially a alkylamine or a polyakylamine derivative of an amine group. The organic polymeric material may contain ethylenically unsaturated groups or halogen groups, and reaction may take place during cross-linking of the organic polymeric material. Compositions comprising coated particulate filler and organic polymeric material have improved tensile modulus.

28 Claims, No Drawings

FILLER AND POLYMER COMPOSITION CONTAINING FILLER

This invention relates to a filler for use in compositions of organic polymeric material, to a process for producing the filler, and to a composition of an organic polymeric material containing the filler.

It is well known to modify the properties of a wide variety of organic polymeric materials by incorporating into such materials one or more inorganic materials in finely divided form. These inorganic materials, commonly known as fillers, are generally less expensive than organic polymeric materials and they may serve to increase the bulk of the resultant composition and so permit a polymeric material to be used more economically, and they may also serve to enhance at least some of the physical properties of the polymeric material, for example the hardness, tensile modulus, tensile strength or resistance to wear of the organic polymeric material. For example, the properties of organic polymeric materials which are cross-linked ethylenically unsaturated elastomers, e.g. natural rubber, polybutadiene, polyisoprene, ethylene-propylenediene copolymer and styrene-butadiene elastomer, are known to be improved by incorporating particulate materials therein, e.g. carbon black.

Not only is it desirable to make such fillers and organic polymeric material as compatible as possible but it is also desirable to be able to make compositions containing high proportions of filler so as to confer the physical and cost advantages of the filler onto the resulting composition to the maximum practicable extent. It is especially desirable, when considering possible shortages of hydrocarbon raw materials, to be able to use cheap and readily available fillers as much as possible.

In order to improve the compatibility of such fillers with organic polymeric materials it is known to incorporate coupling agents in compositions comprising filler and organic polymeric material which coupling agents have an affinity for both the surface of the filler and for the organic polymeric material For example, in our British Patent No. 1 603 300 we have described a basic particulate filler to the surface of which there is bound an acidic group-containing organic polymer which contains at least one ethylenically unsaturated group, the acidic group having an affinity for the surface of the filler and the ethylenically unsaturated groups having an affinity for the organic polymeric material in which the filler is incorporated.

We have now found that it is possible to modify a particulate filler in such a way that the modified filler is readily incorporated into an organic polymeric material and in such a way that the resultant composition containing the modified filler has particularly desirable properties, for example, desirable tensile strength and tensile modulus, and in particular an increased tensile modulus, when compared with a composition containing the same porportion of the same filler which has not been subjected to modification.

According to the present invention there is provided a coated particulate filler to the surface of which there is bound an acidic group-containing organic polymer which organic polymer also comprises a nitrogen-containing group capable of reacting with an organic polymeric material.

In a further embodiment of the invention there is provided a process for the production of a coated particulate filler which process comprises mixing a particulate filler with an acidic group-containing organic polymer which organic polymer also comprises a nitrogen-containing group capable of reacting with an organic polymeric material.

In yet a further embodiment of the invention there is provided a composition comprising an organic polymeric material and a coated particulate filler as hereinbefore described.

The acidic group-containing organic polymer is bound to the surface of the particulate filler by which we mean that it should have an affinity for the surface of the particulate filler, and it may be chemically reacted therewith. Particularly suitable fillers are basic particulate inorganic fillers reactive with the acidic groups of the organic polymer, for example, alkaline earth metal oxides, hydrated oxides thereof, alkaline earth metal hydroxides, and alkaline earth metal carbonates and basic carbonates thereof, although the invention is not limited to such specific types of filler. Examples of such fillers include magnesium oxide, magnesium hydroxide and magnesium carbonate. A particularly preferred inorganic particulate filler is calcium carbonate which is available in the form of ground chalk and is also produced on a large scale by precipitation from milk of lime. Other suitable basic particulate fillers include oxides, hydroxides, hydrated oxides, carbonates and basic carbonates of aluminium and zinc. Mixtures of two or more different inorganic particulate fillers may be used.

The filler may be a siliceous filler, for example, silica or a siliceous material, e.g. a siliceous clay such as an alkali metal silicate.

The particulate filler may have any form suitable for use as a filler and it may have a wide variety of shapes and sizes. For example, it may be of substantially spherical shape, though it may if desired be of fibrillar or laminar form.

Most commonly the filler particles will have a size in the range 40 Angstroms to 1 mm, though it is preferred, on account of the superior reinforcing effect, that the particle size is in the range 40 Angstroms to 10000 Angstroms, for example about 200 to 1000 Angstroms.

Most conveniently the particulate filler is in the form of a finely divided, free flowing powder, and this is the form in which such fillers are usually available in commerce.

Within the scope of the term "acidic group" in the expression "acidic group-containing organic polymer" we include not only organic polymers containing acidic groups in the form of the acid but also salts of acidic groups and groups convertible to acid groups under the process conditions, for example carboxylic acid anhydride groups and ester groups.

The acidic group-containing organic polymer to which the particulate inorganic filler is bound should contain at least one acidic group per molecule. Suitable acidic groups include carboxylic acid groups, sulphonic acid groups and phosphonic acid groups. The acidic group-containing organic polymer may contain more than one acidic group per molecule and indeed it is preferred that the polymer does contain more than one such group per molecule as in general the greater is the number of such groups per molecule the greater is the affinity of the organic polymer for the surface of the particulate filler and the more likely is the organic polymer to be water- soluble or at least readily water-dispersible thus permitting the process of the invention to be effected in an aqueous medium.

Water-solubility or dispersibility of the acidic group-containing organic polymer may be increased by forming a salt of the acidic group, for example, an alkali metal salt, an ammonium salt, or a trialkyl ammonium salt of a carboxylic acid group. An example of a group convertible to a free acid group under the process conditions is a carboxylic acid anhydride group which may be hydrolysed to a free acid in the process, particularly where the process is effected in an aqueous medium. A water-insoluble salt may be used, for example an alkaline earth metal salt, e.g. a calcium or magnesium salt of a carboxylic acid.

The inorganic particulate filler is preferably insoluble in water so that the process may be effected in an aqueous medium.

The acidic group-containing organic polymer also comprises a nitrogen-containing group which is capable of reacting with an organic polymeric material.

The nitrogen-containing group may react with a group or groups in the organic polymeric material. For example, the nitrogen-containing group may react, directly or indirectly, with an ethylenically unsaturated group in the organic polymeric material, or with a halogen group or with an acidic group in the latter material. Reaction may take place, for example, during processing of the composition of the invention, e.g. during shaping. Alternatively, where the organic polymeric material is capable of being chemically crosslinked, that is cured, reaction of the nitrogen-containing group may take place during the curing reaction. The curing of the organic polymeric material may be effected in a variety of different ways. For example, the organic polymeric material may contain ethylenic unsaturation, as in an ethylenically unsaturated elastomer, and it may be cured by reaction with a curing system based on sulphur optionally containing suitable accelerators. Alternatively, the organic polymeric material may be cured by reaction with a peroxide, in which case the organic polymeric material may, or may not, contain ethylenic unsaturation. The choice of the nitrogen-containing group in the organic polymer bound to the surface of the particulate filler may be determined by the nature of the reactive groups in the organic polymeric material or, where the organic polymeric material is to be cross-linked, by the type of reaction by which the organic polymeric material is to be cross-linked.

Examples of nitrogen-containing groups in the organic polymer include amine groups, for example amine groups of the structure $-NR_1R_2$, where $R_1$ and $R_2$ may be hydrogen, that is primary amine, one of $R_1$ and $R_2$ may be hydrogen and one may be an alkyl group, that is secondary amine, both of $R_1$ and $R_2$ may be an alkyl group, that is tertiary amine, or one or both of $R_1$ and $R_2$ may be alkyl amine or polyalkylamine, in which case the organic polymer may contain amine groups of different functionalities. The nitrogen-containing group may be an amide group, for example an amide group of the structure, $-CONR_1R_2$ in which $R_1$ and $R_2$ may be hydrogen and/or an alkyl group and/or an alkylamine group or polyalkylamine group as hereinbefore described. Amine and amide groups are suitable as nitrogen-containing groups. Amine groups are capable of reacting with ethylenically unsaturated groups and of taking part in the curing of ethylenically unsaturated organic polymeric materials, e.g. in the sulphur or peroxide curing of organic polymeric materials, and amide groups are believed to react similarly. In general, primary amine groups are more reactive than secondary amine groups, which in turn are more reactive than amide groups. Amine and amide groups are also capable of reacting with halogen-containing and acidic group-containing organic polymeric materials, for example halogen-containing elastomers, e.g. polychloroprene rubber, and thermoplastic materials, e.g. polyvinyl chloride.

The organic polymer which contains an acidic group and also a nitrogen-containing group may comprise a hydrocarbon backbone from which the acidic group and the nitrogen-containing group are pendant. For example, the organic polymer may be a polymer or copolymer of one or more suitable ethylenically unsaturated monomers. Where the nitrogen-containing group is an amide group and the acidic group is a carboxylic acid group the organic polymer may be a copolymer containing units derived from acrylic acid and/or methacrylic acid and acrylamide and/or methyacrylamide. Alternatively, an organic polymer containing both carboxylic acid groups and amide groups may be formed from polyacrylamide by hydrolysis of some of the amide groups therein to carboxylic acid groups.

The organic polymer or copolymer may contain units derived from other monomers which contain neither acidic groups nor nitrogen-containing groups. Such other monomers may modify the physical properties of the organic polymer, for example, make the polymer more hydrophobic. The organic polymer or copolymer may also contain functional groups other than acidic groups and nitrogen-containing groups.

An organic polymer containing amine groups as the nitrogen-containing group may be formed from an organic polymer containing amide groups by subjecting the organic polymer to a Hofmann reaction, that is reaction with alkali metal hypochlorite. The reaction may not proceed cleanly to convert amide groups to amine groups, and it is possible that other reactive nitrogen-containing groups may be formed, for example urea groups

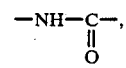

which groups may be a ring structure on the organic polymer, e.g.

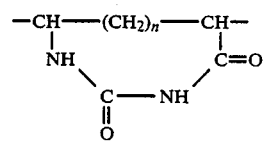

where -13 CH—$(CH_2)_n$—CH—represents the backbone of the organic polymer, see, for example, Organic Reactions, Volume 3, ed. R Adams. Also, there may be incomplete reaction of the amide groups, and it is to be understood that within the scope of the present invention there is included a coated particulate filler to the surface of which there is bound an acidic group-containing organic polymer which comprises two or more different nitrogen-containing groups in the same organic polymer. Also included is a coated particulate filler to the surface of which are bound two or more different organic polymers of the type described. The coating on the particulate filler may also include material which may be bound to the surface of the filler which is different from the acidic group-containing nitrogen group-containing polymer described herein, for example, an organic polymer containing an acidic group and a reactive group, e.g. an ethylenically unsaturated group, different from the nitrogen containing group.

In the coated particulate filler it is essential that the coating comprise an acidic group-containing nitrogen group-containing material which is in the form of an organic polymer if the aforementioned beneficial effects of the coating are to be achieved, and in particular if an increased tensile modulus in a composition comprising an organic polymeric material and filler is to be obtained when compared with a composition comprising the same proportion of the same filler which has not been coated. The beneficial effects, and in particular a substantial improvement in tensile modulus of a composition comprising organic polymeric material and filler, are not achieved where the particulate inorganic filler is coated with a monomeric material comprising the aforementioned groups. For example, in the Bulletin of the Institute for Chemical Research, Kyoto University 40, No 4 1963, the production of precipitated calcium carbonate by carbonation of calcium hydroxide solution in the presence of carboxyl group-containing nitrogen group-containing compounds is described. Examples of such compounds are sodium glutamate and p-amino benzoic acid. Incorporation of the resultant calcium carbonate as a filler into SBR vulcanisates generally results in a decrease in tensile modulus of the vulcanisate, when compared with that of a composition comprising calcium carbonate filler produced in the absence of a carboxyl group-containing nitrogen group-containing compound.

The organic polymer will generally have a molecular weight of at least 500, preferably at least 1000. It may have a molecular weight of $10^4$ or greater. The molecular weight may be as great as $10^6$.

The process of the invention by which a coated particulate filler is produced may be effected by forming a mixture of the particulate filler and the acidic group-containing organic polymer. The mixture may be heated although heating may not be necessary especially where a solvent or dispersant for the polymer is used and/or the acidic group is particularly reactive. Thus, the reaction may be carried out at a temperature over a wide range, depending upon the materials used. The rate at which the reaction of the particulate filler and the acidic group-containing organic polymer takes place usually increases as higher temperatures are used, but at high temperatures the risk of the decomposition of the organic polymer tends to increase. Thus the reaction is preferably effected at a temperature in the range 0° C. to 200° C., though other temperatures may be used if desired. The optimum conditions may be determined by simple trial. The time required also depends upon the materials and the conditions employed, but commonly is in the range 1 minute to 6 hours. The reaction may be carried out most conveniently at ambient pressure, though higher or lower pressures may be used if desired.

The reaction may be further assisted in several ways. For example, the mixture may be stirred or it may be milled, e.g. in a ball mill. Also a solvent or dispersant for the acidic group-containing organic polymer may be used, and is necessary where the polymer is a solid. The solvent or dispersant may serve several useful functions. Thus, it may reduce the viscosity of the acidic group-containing organic polymer, improve the ease and evenness of the spreading of the polymer over the filler particles, promote the intimate contact and interaction between the components, assist in controlling the temperature of the mixture, or assist in preventing degradation of the polymer by excluding oxygen from it. Where the acidic group-containing organic polymer is of relatively low molecular weight and is liquid it may not be necessary to use a solvent or dispersant for the polymer.

In general, it is preferred to use a solvent in which the organic polymer is substantially completely dissolved rather than dispersed, and the process will be described hereafter with reference to use of such a solvent. The solvent should be chemically inert towards the organic polymer and to the particulate filler and it is especially desirable that it should be inert towards the filler so that it is not preferentially adsorbed thereon to an extent which appreciably diminishes the affinity of the organic polymer for the surface of the filler particles.

Examples of organic solvents or dispersants include hydrocarbons, for example aliphatic, aromatic, araliphatic or cycloaliphatic hydrocarbons; e.g. toluene, xylene and petroleum fractions; halogenated and especially chlorinated hydrocarbons, for example methylene chloride, chloroform, carbon tetrachloride, 1,2-dichloroethane, trichloroethylene and tetrachloroethylene; ethers, for example diethyl ether; alcohols, for example methanol and ethanol; ketones, for example acetone and methyl ethyl ketone; and mixtures thereof. The choice of solvent or dispersant will be guided by such factors as low flammability, low toxicity, and boiling point, which may be significant both in use and in the removal of the solvent or dispersant from the treated particulate filler.

A preferred solvent for the acidic group-containing organic polymer is water on account of its ease of handling, its low cost, and the absence of toxicity problems. Furthermore, the particulate filler, especially where it is a small particle size synthetically prepared filler, e.g. calcium carbonate prepared by carbonation of milk of lime, may be available as an aqueous dispersion, and use of water as a solvent for the acidic group-containing organic polymer obviates the need to separate the filler from the aqueous dispersion prior to coating.

The number of acidic groups and nitrogen-containing groups which are present in the organic polymer and the molecular weight of the polymer will have a bearing on the nature of the solvent which is used. Thus, as organic polymers are generally readily soluble in organic solvents the desired concentration of the acidic group-containing organic polymer in an organic solvent may be achieved even where the molecular weight of the polymer varies over a wide range. The acidic groups and the nitrogen-containing groups in the organic polymer will in general have an effect on the solubility in organic solvents and the number of such groups per molecule may be critical. Where water is used as a solvent the molecular weight and the number of acidic groups and nitrogen-containing groups per molecule may also be critical, but we find that in general the organic polymers, particularly when in a suitable salt form, e.g. an alkali metal salt form, are readily soluble in water.

The proportion of solvent should be sufficient to dissolve the acidic group-containing organic polymer, as incomplete solution may result in undesirable local concentration of unbound polymer, and be sufficient to produce a solution which can readily flow and mix with the filler particles. Suitable proportions can be determined by simple trial and are not necessarily critical.

It is also important that the amount of solution containing the acidic group-containing organic polymer which is used should be sufficient to cover the surface of the filler particles as thoroughly as possible if the best products, that is the most useful fillers are to result. Conveniently, an excess of solution sufficient to produce a thoroughly wetted mixture may be used. The coated particulate filler may be separated from the solution and dried.

The reaction may be carried out in the presence of protecting agents, e.g. antioxidants, and/or in an inert atmosphere, e.g. nitrogen, argon or solvent vapour, if it is desired to guard against deterioration of the organic polymer during any heating that may be necessary.

The proportion of the acidic group-containing organic polymer and the filler particles may be varied within wide limits according to the materials employed and the proportions desired in the product and in the polymer composition in which the coated filler particles may ultimately be incorporated. However, an upper limit on the proportion of acidic group-containing organic polymer will be set by the amount of said polymer which is capable of reacting with the filler particles, and this will depend inter alia on the surface area per unit weight of the filler particles.

Commonly, the coated filler particles contain in the range 0.2% to 40% by weight of the organic polymer and correspondingly 99.8 to 60% by weight of the particulate filler, though products having proportions outside this range may be made if desired. Preferred proportions are in the range 0.5% to 20% by weight of the organic polymer bound to the particulate filler, more preferably 0.5% to 10% by weight.

The coated particulate filler may serve as a masterbatch in which a filler coated with a large proportion of organic polymer is subsequently mixed with a particulate uncoated filler.

When the acidic group-containing organic polymer has been applied to and bound to the surface of the filler particles, the resulting product may be in a form in which it can be used directly as a filler or it may need to be treated mechanically, e.g. by grinding, to break up agglomerates and reduce the filler to a suitably small particle size. This is not essential in all cases, however, as any necessary break-down of the agglomerates may take place satisfactorily while the filler is being incorporated into a polymer composition, for example by milling.

The organic polymeric material into which the coated particulate filler is incorporated in the composition of the invention may be in any convenient form and incorporation may be carried out by conventional mixing means, for example by calendering on a twin-roll mill or by mixing on a screw extruder. The organic polymeric material may itself be in particulate form prior to mixing, e.g in a screw extruder, or it may be in the form of a sheet, e.g. on a twin-roll mill prior to incorporation of the coated particulate filler.

The organic polymeric material may be of widely varying chemical composition. For example, the organic polymeric material may be a natural or synthetic elastomer, for example a butadiene-based elastomer, e.g. butadiene-styrene and butadiene-acrylonitrile rubbers, polybutadiene, polyisoprene, or natural rubber, or an ethylene-propylene diene copolymer. The aforementioned elastomers all contain ethylenic unsaturation and they may be cured by reaction with sulphur-based curing systems which are known in the art, or by reaction with a peroxide curing agent.

Other organic polymeric materials include hydrocarbon elastomers which do not contain ethylenic unsaturation, e.g. ethylene-propylene copolymer, which may be cured by reaction with a peroxide, and halogen-containing organic polymeric materials, e.g. polychloroprene, chlorinated polyethylene, and chlorosulphonated polyethylene, and thermoplastic or thermosetting materials which are not elastomeric, e.g. polyvinyl chloride.

The composition of the invention may be produced by mixing a particulate filler, an acidic-group containing organic polymer which also comprises a nitrogen-containing groups as hereinbefore described, and an organic polymeric material. In this case it is believed that during the mixing process the filler particles bind to the acidic group-containing organic polymer. Mixing may be effected at elevated temperature. It is not necessary for all of the acidic group-containing organic polymer to bind to the particulate filler during the mixing operation. Indeed binding may not take place as readily as in the case where particulate filler is bound to the acidic group-containing organic polymer in the absence of organic polymeric material, for example when mixed in the presence of a solvent for the acidic group-containing organic polymer, and it may be desirable to use in this process an amount of acidic group-containing organic polymer by weight of particulate filler which is greater than would normally be used. In order that the acidic group-containing organic polymer should be readily dispersible in the organic polymeric material it is preferred that the glass transition temperature of the acidic group-containing organic polymer be lower than the temperature at which mixing is effected.

The optimum proportion of coated inorganic particulate filler to organic polymeric material will be determined by the use to which the filled composition is to be put. In general 5% to 300% of coated filler by weight of organic polymeric material into which it is incorporated will suffice, preferably 10% to 200% by weight.

The composition may also contain conventional additives, for example antioxidants, plasticisers, vulcanisation accelerators, pigments, antiozonants, and fillers other than those of the present invention.

The invention is illustrated by the following examples.

EXAMPLES 1 and 2

A gaseous stream of a mixture of carbon dioxide and air was passed through 7 liters of milk of lime containing 38 g of calcium hydroxide per liter until the pH of the suspension reached 7.0. (The flow rates of the gases were carbon dioxide 300 liters/hour and air 400 liters per hour). The flow of the gaseous stream was then stopped and the suspension was heated until a temperature of 85° C. was reached after 15 minutes and the suspension was maintained at a temperature of 85° for 30 minutes during which time the pH rose. A gaseous stream of carbon dioxide (30 liters per hour) and air (40 liters per hour) was then passed through the suspension until the pH had fallen to 8.5.

Two batches of the resultant suspension of calcium carbonate in water were separately mixed with, in the case of Example 1, an aqueous solution containing 8.4 weight % of the ammonium salt of an acrylic acid/a- crylamide copolymer (47% by weight acrylic acid, 53% by weight acrylamide) in an amount sufficient to produce a coating on the calcium carbonate in an amount of 1.5% by weight of the coated calcium carbonate, and, in the case of Example 2, an aqueous solution of a copolymer produced as hereinafter described in an amount sufficient to produce a coating on the calcium carbonate in an amount of 1.5% by weight of the coated calcium carbonate.

In each Example the calcium carbonate suspension and the solution of polymer were mixed at 85° C. for 15 minutes, the coated calcium carbonate was filtered, dried in an oven at 115° C., and finally lightly ground.

The aqueous solution of copolymer used in Example 2 was prepared as follows. An acrylic acid-acrylamide copolymer (47% by weight acrylic acid, 53% by weight acrylamide) was dissolved in water to form an 11% weight/volume solution, and 1 part by weight of copolymer, as a solution, was reacted at 0° C. for 75 minutes with 1.1 parts by weight of sodium hypochlorite, as a 14% weight/volume solution of active chlorine, and 2.5 parts by weight of sodium hydroxide, as a 50% weight/volume solution, in order to convert amide groups to amine groups or other nitrogen-containing groups. The reaction mixture was then allowed to stand for 16 hours at 20° C. and was acidified to pH 1 by addition of dilute aqueous hydrochloric acid solution. Dilute sodium hydroxide solution was added to the reaction mixture until a pH of 5 was reached and the copolymer was precipitated. The copolymer was washed with water and dissolved in dilute ammonium hydroxide solution to form an 8.3% by weight solution.

Each of the coated calcium carbonate samples was evaluated as a filler in a rubber composition which was compounded on a twin-roll mill and compression moulded at 160° C. for a time sufficient to produce full cure as indicated by a Monsanto rheometer.

The rubber composition was as follows.

|  | Parts by Weight |
| --- | --- |
| Oil-extended ethylene-propylene-diene elastomer (Vistolan 3666) | 100 |
| Zinc oxide | 2.85 |
| Stearic acid | 1.14 |
| Sulphur | 0.91 |
| Tetramethyl thiuram mono sulphide (Vulcafor) | 0.91 |
| 2-Mercaptobenzthiazole (Vulcafor) | 0.91 |
| Tetramethyl thiuram disulphide (Vulcafor) | 0.45 |
| Filler | 87 |

By way of comparison the above procedure was repeated except that the suspension of calcium carbonate was not coated by mixing with a solution of a polymer (comparison Example A), and the suspension of calcium carbonate was mixed with a 7.5% weight aqueous solution of ammonium stearate to produce a coating on the calcium carbonate in an amount of 2.7% by weight of the coated calcium carbonate. (Comparison Example B).

The properties of the cured rubber compositions were as follows.

|  | Example 1 | Example 2 | Comparison Example A | Comparison Example B |
| --- | --- | --- | --- | --- |
| Tensile Strength MPa | 11 | 12 | 10 | 5 |
| Tensile Modulus (300%) MPa | 3.4 | 5.8 | 2.3 | 1.4 |
| Tear Strength N/mm | 19 | 21 | 16 | 10 |
| Hardness IRHD | 61 | 57 | 63 | 54 |
| Rebound Resilience % | 58 | 66 | 58 | 62 |

EXAMPLE 3 to 5

In three separate Examples the procedure of Example 1 was followed except that the following polymer solutions were mixed with the suspension of calcium carbonate in order to coat the calcium carbonate.

EXAMPLE 3

A copolymer of 80% by weight of acrylic acid and 20% by weight of acrylamide was dissolved in water, the resultant solution was neutralised by addition of aqueous sodium hydroxide, and the solution was heated at 90° C. with triethylene tetramine (1 mole per mole of acrylamide) until no free amine remained. The resultant solution contained 15% by weight of copolymer.

EXAMPLE 4

The procedure of Example 3 was repeated except that diethylene triamine was used in place of triethylene tetramine, and the resultant solution contained 13% by weight of copolymer.

EXAMPLE 5

The procedure of Example 4 was repeated except that ethylene diamine was used in place of triethylene tetramine, and the resultant solution contained 10% by weight of copolymer.

The properties of the cured rubber compositions were as follows.

|  | Example 3 | Example 4 | Example 5 |
| --- | --- | --- | --- |
| Tensile Strength MPa | 12 | 12 | 13 |
| Tensile Modulus (300%) MPa | 4.2 | 4.2 | 3.4 |
| Tear Strength N/mm | 24 | 25 | 22 |
| Hardness IRHD | 59 | 59 | 61 |
| Rebound Resilience % | 60 | 62 | 59 |

Example 6 to 8

A polymer solution was prepared by copolymerising methyl methacrylate, butyl acrylate, methacrylic acid and acrylamide in proportions of 3:3:2:2 by weight in isopropanol using azobisisobutyronitrile as catalyst. The resultant polymer solution was divided into three portions.

EXAMPLE 6

A portion of the polymer solution was neutralised by addition of aqueous sodium hydroxide solution, and the resultant solution was reacted with triethylene tetramine at 90° C. until no free amine remained. The triethylene tetramine was used in an amount equimolar to the acrylamide in the copolymer. The polymer solution, which contained 30% by weight of polymer was diluted with water to form a 10% by weight solution.

EXAMPLE 7

The procedure of Example 6 was repeated except that the polymer in solution was neutralised with ammonium hydroxide in place of sodium hydroxide.

EXAMPLE 8

The procedure of Example 6 was repeated except that the polymer solution was neutralised with ammonium hydroxide in place of the sodium hydroxide, and the triethylene tetramine was used in an amount of 0.5 mole per mole of acrylamide in the polymer.

The procedure of Example 1 was then followed in three separate examples to coat calcium carbonate with the polymers in the solutions of Examples 6, 7 and 8 in an amount of 1.5% by weight of the coated calcium carbonate.

The coated calcium carbonates were then evaluated as fillers in rubber compositions following the procedure described in Example 1.

The properties of the cured rubber compositions were as follows:

|  | Example 6 | Example 7 | Example 8 |
| --- | --- | --- | --- |
| Tensile Strength MPa | 12 | 12 | 12 |
| Tensile Modulus 300% MPa | 4.9 | 4.7 | 3.7 |
| Tear Strength N/mm | 24 | 24 | 21 |
| Hardness IRHD | 58 | 57 | 58 |
| Rebound Resilience % | 68 | 69 | 66 |

EXAMPLE 9

40 g of polyacrylamide (Versicol WN15, number average molecular weight 140000) was dissolved in 400 ml of distilled water to form a first solution and the solution was cooled to 2° C. 141 ml of aqueous sodium hypochlorite solution containing 14.2% weight/volume of active chlorine, 90 g of sodium hydroxide, and 310 ml of distilled water were mixed to form a second solution. The second solution was cooled to −10° C. and added dropwise with stirring to the first solution over a period of 1 hour, the temperature being maintained at 0° C. to 2° C., in order to convert some of the amide groups of the polymer to amine groups or to other nitrogen-containing groups. The resultant solution was warmed to 20° C. and a further 20 g of sodium hydroxide in 50ml of distilled water was added and the resultant mixture was heated at 90° C. for 3 hours in order to hydrolyse some of the amide groups of the polymer to carboxyl groups. The mixture was then cooled to 20° C., acidified to pH 1 by addition of aqueous hydrochloric acid solution, and dilute sodium hydroxide solution was added until the polymer was precipitated. Finally, the polymer was washed with water and dissolved in dilute ammonium hydroxide solution to form a 4.1% by weight solution.

The coating procedure of Example 1 was followed except that the solution produced as described above was used in place of the solution of the ammonium salt of an acrylic acid/acrylamide copolymer used in Example 1. The coated calcium carbonate, containing 1.5% by weight of coating, was compounded in a rubber composition following the procedure described in Example 1 and cured. In Comparison Example C the above compounding and curing procedure was repeated except that the filler used was calcium carbonate coated with 1.5% by weight of polyacrylamide (Versicol WN15).

The properties of the cured rubber compositions were as follows:

|  | Example 9 | Comparison Example C |
| --- | --- | --- |
| Tensile Strength MPa | 14 | 12 |
| Tensile Modulus (300%) MPa | 5.7 | 3.0 |
| Tear Strength N/mn | 25 | 20 |

EXAMPLE 10

Uncoated precipitated calcium carbonate (Calofort U John E Sturge) was coated with 2% by weight of the polymer produced as described in Example 9 by adding a solution of the polymer in ammonium hydroxide to a stirred aqueous slurry of the calcium carbonate, filtering and drying the coated calcium carbonate.

The coated calcium carbonate was then compounded as a filler in a rubber composition and the composition was cured following the procedure described in Example 1 except that the rubber composition was as follows:

|  | parts of weight |
| --- | --- |
| SBR 1502 | 100 |
| Zinc oxide | 5 |
| Stearic acid | 1 |
| Vulcafor 9 | 2 |
| Sulphur | 2.5 |
| Filler | 100 |

In comparative Examples D and E rubber compositions were produced as described above except that the filler used was, respectively, precitpitated calcium carbonate (Calofort U) coated with 2% by weight of amino undecanoic acid, and uncoated precipitated calcium carbonate (Calofort U).

The properties of the cured rubber compositions were as follows:

|  | Example 10 | Comparative Example D | Comparative Example E |
| --- | --- | --- | --- |
| Tensile Strength MPa | 9 | 7 | 6 |
| Tensile Modulus (300%) MPa | 5.3 | 2.3 | 1.9 |
| Tear Strength N/mn | 27 | 20 | 20 |
| Hardness IRHD | 75 | 66 | 63 |

EXAMPLE 11

The procedure of Example 10 and of comparative Examples D and E was repeated in, respectively, Example 11 and comparative Examples F and G, except that the following rubber composition was compounded.

|  | parts by weight |
| --- | --- |
| Neoprene WRT | 100 |
| Zinc oxide | 5 |
| Stearic acid | 0.5 |
| Sulphur | 1.0 |
| Vulcafor TMTD | 1.0 |
| DOTG | 1.0 |
| Maglite D | 4.0 |
| Permanax OD | 2.0 |

-continued

| | parts by weight |
|---|---|
| Paraffin wax | 1.0 |
| Dutrex | 10 |
| Filler | 100 |

The properties of the cured rubber compositions were as follows:

| | Example 11 | Comparative Example F | Comparative Example G |
|---|---|---|---|
| Tensile Strength MPa | 13 | 8 | 10 |
| Tensile Modulus (300%) MPa | 9.5 | 6.4 | 3.3 |
| Tear Strength N/mm | 52 | 38 | 36 |

EXAMPLE 12

An uncoated precipitated calcium carbonate as used in Example 10 was compounded in an SBR rubber composition as described in Example 10, except that in addition there was added to the rubber composition during compounding 5 parts by weight of polymer obtained by evaporating to dryness the polymer solution produced as described in Example 9.

The cured rubber composition had a tensile strength of 8 mPa and a tensile modulus (300%) of 3.0 mPA.

EXAMPLES 13 and 14

The procedure of Example 1 was used to produce coated precipitated calcium carbonates except that in Example 13 the calcium carbonate was coated with 1% by weight of coating of the polymer of Example 9, and in Example 14 the calcium carbonate was coated with 0.5% by weight of the polymer of Example 9 and 0.5% by weight of an ammonium salt of maleinised polybutadiene as described in GB Pat. No. 1603300. The filler of comparative Example H was uncoated calcium carbonate and that of comparative Example J precipitated calcium carbonate coated with 1% by weight of ammonium salt of maleinised polybutadiene.

The rubber compounding procedure of Example 1 was followed to produce cured rubber compositions having the following properties:

| | Example 13 | Example 14 | Comparative Example H | Comparative Example J |
|---|---|---|---|---|
| Tensile Strength MPa | 12 | 15 | 10 | 13 |
| Tensile Modulus (300%) MPa | 4.0 | 4.5 | 2.3 | 3.0 |
| Tear Strength N/mm | 23 | 27 | 16 | 22 |
| Rebound Resilience % | 69 | 65 | 58 | 57 |

EXAMPLE 15

An aqueous solution of a copolymer prepared as described in Example 2 was added to a stirred aqueous slurry of magnesium hydroxide (BDH) in an amount sufficient to give a 2 weight % coating on the magnesium hydroxide. The coated magnesium hydroxide filler was filtered, dried and lightly ground and compounded with the following peroxide curing rubber composition:

| | parts of weight |
|---|---|
| EPDM elastomer (Vistolan 3666) | 1000 |
| Zinc oxide | 3.4 |
| Permanax WSP | 0.7 |
| Sartomer 206 | 1.4 |
| Perkadox 14-40 | 4.1 |
| Filler | 96 |

In comparative Example K, uncoated magnesium hydroxide was compounded with the rubber composition.

The rubber compositions were cured following the procedure descirbed in Example 1, and the properties of the cured rubber compositions were as follows:

| | Example 15 | Comparative Example K |
|---|---|---|
| Tensile Strength MPa | 9 | 9 |
| Tensile Modulus (500%) MPa | 9.2 | 6.7 |
| Compression Set % (25% strain, 24 hours 70° C.) | 12 | 15 |

We claim:

1. A coated particulate filler, wherein the filler is selected from alkaline earth metal oxides, hydrated oxides, hydroxides, carbonates and basic carbonates, to the surface of which filler is bound an acid group-containing organic polymer wherein the acid group is selected from the group consisting of a carboxylic acid group, a sulfonic acid group and a phosphonic acid group, and wherein the organic polymer also comprises an amine group capable of reacting with an organic polymer material and formed by reaction of an amide group-containing organic polymer with alkali metal hypochlorite.

2. A coated particulate filler as claimed in claim 1 characterised in that the particulate filler is calcium carbonate.

3. A coated particulate filler as claimed in claim 1 characterised in that the aimine group is capable of reacting with an ethylenically unsaturated group or with a halogen group or with an acidic group in the organic polymeric material.

4. A coated particulate filler as claimed in claim 1 characterised in that the amine group is capable of reacting with the organic polymeric material during cross-linking of the organic polymeric material.

5. A coated particulate filler as claimed in claim 1 characterised in that the amine group has the structure—$NR_1R_2$ where $R_1$ and $R_2$ are hydrogen, or one of $R_1$ and $R_2$ is hydrogen and the other is an alkyl group, or both of $R_1$ and $R_2$ are alkyl groups, or one or both of $R_1$ and $R_2$ are alkylamine or polyalkylamine.

6. A coated particulate filler as claimed in claim 1 characterised in that the amine group is an amide group.

7. A coated particulate filler is claimed in claim 6 characterised in that the amide group has the structure —$CONR_1R_2$ where $R_1$ and $R_2$ are hydrogen, or one of $R_1$ and $R_2$ is hydrogen and the other is an alkyl group, or both of $R_1$ and $R_2$ are alkyl groups, or one or both of $R_1$ and $R_2$ are alkylamine or polyalkylamine.

8. A coated particulate filler as claimed in claim 1 characterised in that the organic polymer is a polymer or copolymer of one or more ethylenically unsaturated monomers.

9. A coated particulate filler as claimed in claim 6 characterised in that the organic polymer is polyacrylamide in which some of the amide groups have been hydrolysed to carboxylic acid groups.

10. A coated particulate filler as claimed in claim 1 characterised in that the organic polymer contains two or more different nitrogen-containing groups in the same organic polymer.

11. A coated particulate filler as claimed in claim 1 characterised in that the coated particulate filler comprises 0.2% to 40% by weight of organic polymer and 99.8% to 60% by weight of particulate filler.

12. A coated particulate filler as claimed in claim 11 characterised in that the coated particulate filler comprises 0.5 to 10% by weight of organic polymer.

13. A composition comprising a coated particulate filler and an organic polymeric material in which the coated particulate filler has a coating of an acid group-containing organic polymer, characterised in that the polymer comprises a amine group, as claimed in claim 1.

14. A composition as claimed in claim 13 characterised in that the organic polymeric material comprises and ethylenically unsaturated group or a halogen group or an acidic group.

15. A composition as claimed in claim 14 characterised in that the organic polymeric material is a natural or synthetic elastomer.

16. A composition as claimed in claim 13 characterised in that the composition comprises 5% to 300% of coated particulate filler by weight of organic polymeric material.

17. A coated particulate filler according to claim 1 wherein the filler is a carbonate, the acidic group in the acidic group containing organic polymer is a carboxylic acid group, the nitrogen-containing group in the acidic group-containing organic polymer is an amine, and the amine groups in the acidic group-containing organic polymer have been formed by reaction of an acrylamide polymer with an alkali metal hypochlorite.

18. A coated particulate filler as claimed in claim 1 in which the organic polymer is selected from copolymers of acrylic acid and acrylamide; acrylic acid and methacrylamide; acrylic acid, acrylamide and methacrylamide; methacrylic acid and acrylamide; methacrylic acid and methacrylamide; methacrylic acid, acrylamide and methacrylamide; acrylic acid, methacrylic acid and acrylamide; acrylic acid, methacrylic acid and methacrylamide; and acrylic acid, methacrylic acid, acrylamide and methacrylamide.

19. A coated particulate filler to the surface of which there is bound an acid group-containing organic polymer characterized in that the organic polymer also comprises an amine group, which amine has been formed by reaction of an amide group-containing organic polymer with alkali metal hypochlorite.

20. A process for the production of the coated particulate filler as claimed in claim 1 which comprises mixing the particulate filler with the acid group-containing organic polymer.

21. A process as claimed in claim 20 characterised in that the acid group is in the form of an acid, a salt of an acidic group, or a group convertible to an acid group.

22. A process as claimed in claim 21 characterised in that the acid group is a carboxylic acid group.

23. A process as claimed in claim 21 characterised in that the acid group is a carboxylic acid anhydride group or an ester group.

24. A process as claimed in claim 21 characterised in that the salt of an acidic group is an alkali metal salt, an alkaline earth metal salt, an ammonium salt, or a trialkyl ammonium salt of a carboxylic acid group.

25. A process as claimed in claim 20 characterised in that the process is effected in the presence of a solvent for the organic polymer.

26. A process as claimed in claim 25 characterised in that the solvent is water.

27. A process for the production of a composition comprising a coated particulate filler and an organic polymeric material in which the coated particulate filler has a coating of an acid group-containing organic polymer, characterised in that the organic polymer comprises an amine group capable of reacting with an organic polymer material and formed by the reaction of an amide group-containing organic polymer with alkali metal hypochlorite, said process comprising mixing the organic polymeric material with the coated particulate filler.

28. A process for the production of a composition comprising a coated particulate filler and an organic polymeric material in which the coated particulate filler has a coating of an acid group-containing organic polymer, characterised in that the organic polymer comprises an amine group capable of reacting with an organic polymer material and formed by the reaction of an amide group-containing organic polymer with alkali metal hypochlorite, said process comprising mixing the organic polymeric material, the particulate filler and the acid group-containing organic polymer.

* * * * *